(12) United States Patent
Ghazisaidi (10) Patent No.: US 9,509,740 B2
(45) Date of Patent: Nov. 29, 2016

(54) QUALITY OF EXPERIENCE AND NETWORK OPTIMIZATION

(71) Applicant: Verizon Patent and Licensing Inc., Arlington, VA (US)

(72) Inventor: Navid Ghazisaidi, Palo Alto, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 134 days.

(21) Appl. No.: 14/251,407

(22) Filed: Apr. 11, 2014

(65) Prior Publication Data

US 2015/0296047 A1    Oct. 15, 2015

(51) Int. Cl.
  *G06F 15/16*    (2006.01)
  *H04L 29/06*    (2006.01)
  *H04L 29/08*    (2006.01)

(52) U.S. Cl.
  CPC .............. *H04L 65/60* (2013.01); *H04L 67/322* (2013.01)

(58) Field of Classification Search
  CPC . H04L 41/509; H04L 65/80; H04L 67/2847; H04L 65/1026; H04N 21/44209; H04N 21/2402; H04N 21/2401
  USPC .................................................. 709/203, 219
  See application file for complete search history.

(56) References Cited

U.S. PATENT DOCUMENTS

| | | | | |
|---|---|---|---|---|
| 2010/0080290 | A1* | 4/2010 | Mehrotra | H04N 19/147 375/240.07 |
| 2012/0192216 | A1* | 7/2012 | Chen | H04L 41/5025 725/14 |
| 2012/0311126 | A1* | 12/2012 | Jadallah | H04L 41/5067 709/224 |
| 2014/0280679 | A1* | 9/2014 | Dey | H04L 67/2842 709/213 |
| 2015/0074232 | A1* | 3/2015 | Phillips | H04L 65/604 709/219 |
| 2015/0128162 | A1* | 5/2015 | Ionescu | G06Q 30/00 725/14 |
| 2015/0172135 | A1* | 6/2015 | Coppola | H04L 41/5019 709/203 |

* cited by examiner

*Primary Examiner* — Duyen Doan (57) ABSTRACT

A system may receive information indicating that an amount of content, buffered by a user device, is below a threshold amount that is associated with an attribute of the content; and/or information indicating that delivered content exceeds capabilities of the user device. The content may be provided to the user device by a content delivery network ("CDN"). The system may determine whether the CDN has available resources to provide the content to the user device at a bandwidth that is based on the attribute; instruct, when the CDN has the available resources, the CDN to reallocate resources to provide the content to the user device at the particular bandwidth; and switch, when the CDN does not have the available resources, delivery of the content to another CDN. The system may have a global of view of CDNs, and may reallocate CDN resources more intelligently, thus optimizing network resource utilization.

20 Claims, 9 Drawing Sheets

QUALITY OF EXPERIENCE AND NETWORK OPTIMIZATION

BACKGROUND

Networks, such as the Internet, may be used to provide content to users. Content delivery networks ("CDNs") may cache content (e.g., popular content, such as popular television shows, movies, etc.), and may provide the cached content to users. The use of CDNs may reduce the load on networks, and may also improve network performance from the standpoint of users.

DETAILED DESCRIPTION OF PREFERRED EMBODIMENTS

The following detailed description refers to the accompanying drawings. The same reference numbers in different drawings may identify the same or similar elements.

Figure 1:
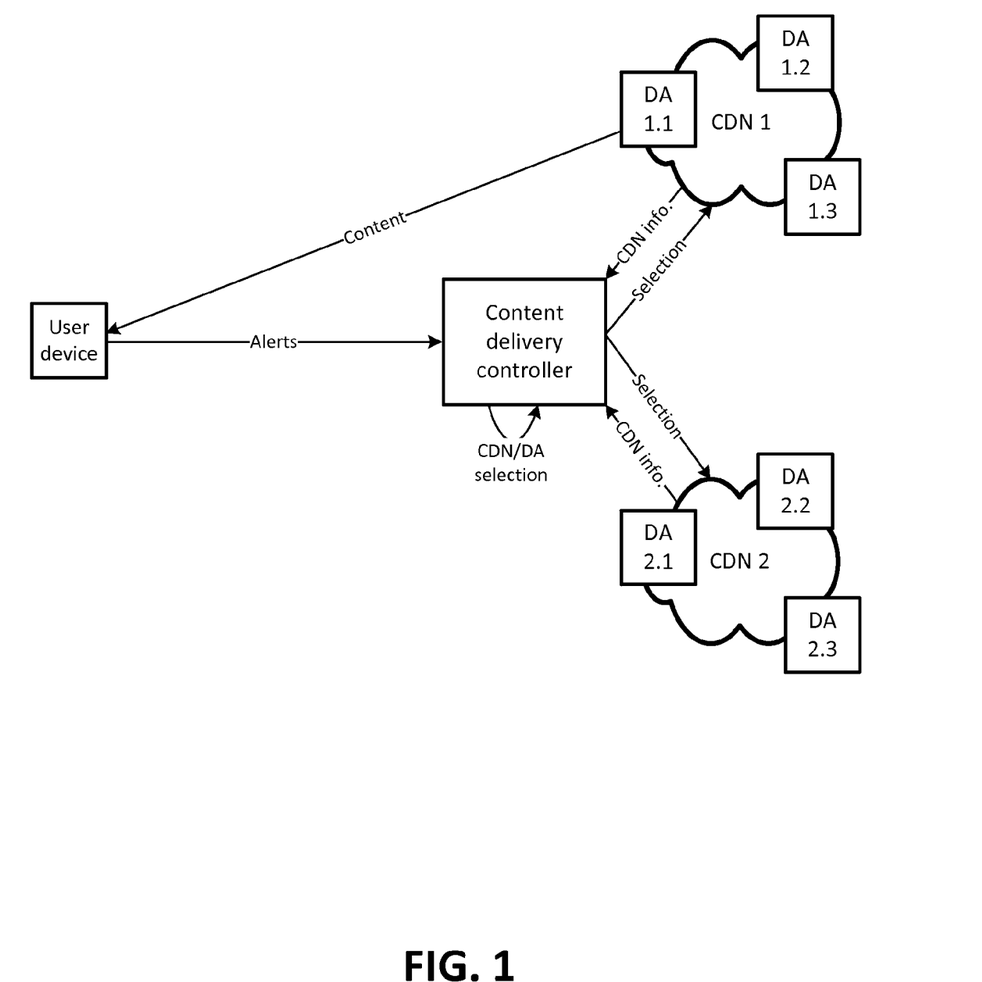
FIGS. 1, 2A, and 2B illustrate an overview of one or more example implementations described herein.

Techniques described herein may allow for the allocation and reallocation of content delivery network ("CDN") resources, based on quality of experience ("QoE") parameters associated with user devices that receive content from CDNs. For example, as shown in FIG. 1, a user device (e.g., a smart phone, a tablet computer, etc.) may receive content, such as video content, from a CDN ("CDN 1"). As shown, CDN 1 may include a number of delivery appliances (e.g., "DA 1.1," "DA 1.2," and "DA 1.3"), which may include cache servers and/or other devices that may store and/or output content to user devices. In the example shown in FIG. 1, the user device may receive content from a DA 1.1, of CDN 1.

The user device may monitor QoE parameters, which may be useful in determining whether the present content delivery is being performed in a manner that optimizes QoE and network usage. For example, the user device may execute a Software-Defined Networking ("SDN") application, which may monitor QoE parameters, such as content buffer state, device capabilities, user preferences, and/or other parameters. As described in greater detail below, based on the monitored parameters, the SDN application may generate alerts when potential QoE conditions are detected.

For example, the SDN application may detect that an amount of content buffered is below a threshold amount that would be optimal for a particular selected content quality. In this situation, QoE may be degraded (e.g., video content may stutter, may buffer intermittently, etc.). Reallocating CDN resources (e.g., providing additional resources and/or switching the content delivery to another CDN or DA that has additional resources available) may improve users' QoE, as the content may be delivered in an uninterrupted manner that is suited to the desired quality level.

As another example, the SDN application may detect that the content exceeds the user device's capabilities (e.g., a resolution of video content exceeds a resolution of a display screen associated with the user device). In this situation, network resources may be needlessly consumed, as higher quality content may be sent to the user device than is necessary. Reallocating CDN resources (e.g., providing lower quality content) may improve network performance, as less network throughput may be consumed by providing lower quality content, and the released network resources can be used to deliver other types of services (e.g., traffic) for other users.

In the example situations mentioned above (and/or other situations), the SDN application may provide an alert to a content delivery controller. The content delivery controller may maintain real-time (or near real-time) status information ("CDN info.") regarding a set of CDNs (e.g., CDN 1, CDN 2, and/or other CDNs), such as information indicating used and/or available resources associated with the CDNs. Based on alerts received from the user device, the content delivery controller may reallocate CDN resources, such as by selecting a new CDN to deliver the content, and/or by selecting a different DA within the same CDN to deliver the content.

Figure 2A:
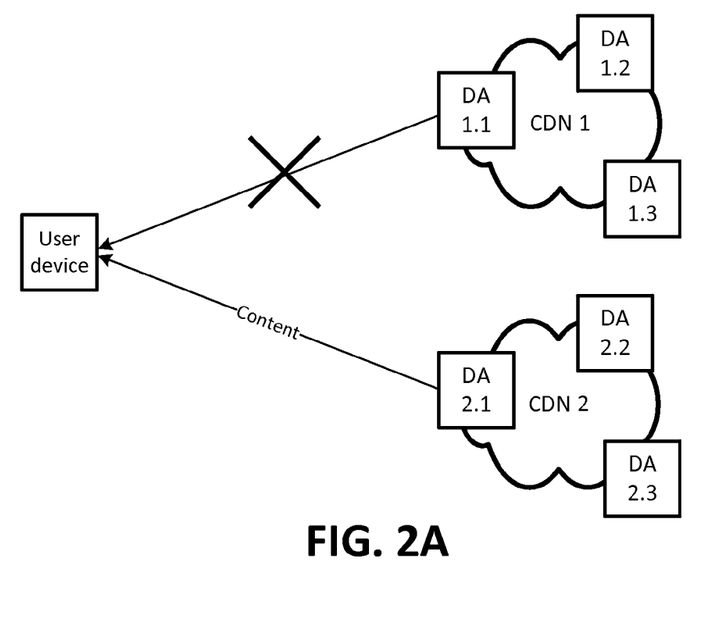
Figure 2B:
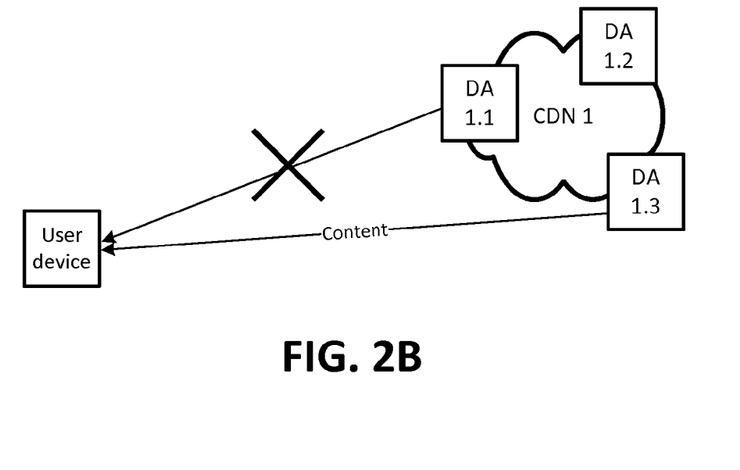

For example, as shown in FIG. 2A, the content delivery controller may determine that CDN 2 should deliver the content, instead of CDN 1. The content delivery controller may send an instruction to CDN 1 and/or CDN 2, indicating that CDN 2 should deliver the content. In some implementations, the content delivery controller may specify a specific DA within CDN 2 (i.e., DA 2.1, in this example) that should deliver the content. As mentioned above, the selection, by the content delivery controller, may be based on the alert received from the user device and/or CDN status information received from the CDNs. FIG. 2B illustrates another example of a reallocation of CDN resources, in accordance with some implementations. As shown, DA 1.3, within CDN 1, may be selected to deliver the content, in lieu of DA 1.1 (associated with the same CDN) delivering the content.

Figure 3:
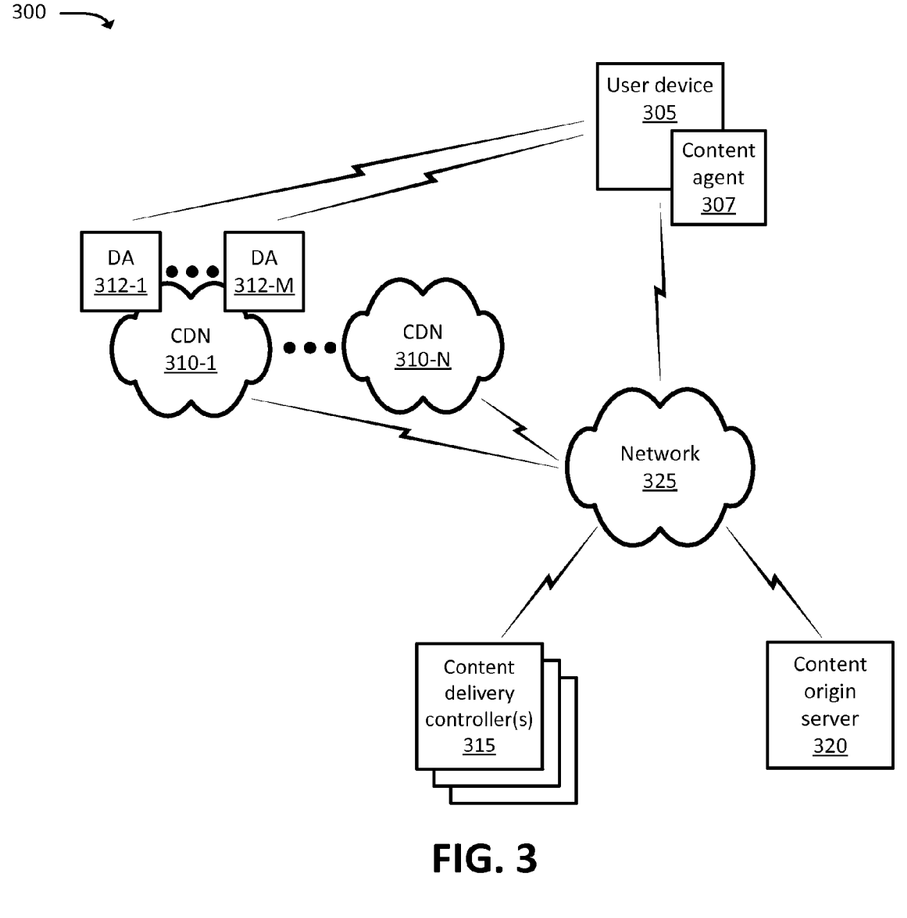
FIGS. 3-5 illustrate examples of one or more environments in which systems and/or methods, described herein, may be implemented.

FIG. 3 illustrates an example environment 300, in which systems and/or methods described herein may be implemented. As shown in FIG. 3, environment 300 may include user device 305, which may include and/or be associated with content agent 307. Environment 300 may also include one or more CDNs 310-1 through 310-N (hereinafter sometimes referred to collectively as "CDNs 310," or individually as "CDN 310," and where N is an integer greater than 1). Each CDN may include one or more DAs 312 (hereinafter sometimes referred to individually as "DA 312"). For example, as shown, CDN 310-1 may include DAs 312-1 through 312-M (where M is an integer greater than 1). Environment 300 may further include one or more content delivery controllers 315 (hereinafter sometimes referred to individually as content delivery controller 315), content origin server 320, and network 325.

User device 305 may include any computation and communication device, such as a wireless mobile communication device that is capable of communicating with CDN 310, DA 312, and/or network 325. For example, user device 305 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system; a network-enabled television; and/or another type of mobile computation and communication device.

In some implementations, user device 305 may be associated with content agent 307. For example, content agent 307 may be incorporated into and/or attached to user device 305 (e.g., implemented as hardware and/or software within user device 305, implemented as a device attached to user device 305, etc.). For instance, content agent 307 may be implemented as, and/or may include, an SDN application that communicates with other components (e.g., hardware components and/or software applications) of user device 305. As described below, content agent 307 may receive and/or determine information regarding user device 305, such as QoE parameters, which may be used by content delivery controller 315 to optimize the delivery of content to user device 305 via CDNs 310. Example functional components of content agent 307 are described below with respect to FIG. 6.

CDN 310 may include a set of devices that deliver content to user device 305. For example, CDN 310 may cache popular content, subscribed content, and/or other content (e.g., content which may be of interest to users of user devices 305), provided by a content provider, such as content origin server 320. CDN 310 may include a set of DAs 312, which may each be or include a set of devices that store cached content, and deliver the cached content to user device 305. In some implementations, different DAs 312 may be located at different geographical locations, and may be selected based on proximity to user device 305 and/or other factors. In some implementations, CDN 310 may include one or more devices (not pictured) that control the selection of a particular DA 312, within CDN 310, based on location. As described below, CDN 310 may include, and/or be in communication with, one or more content delivery controllers 315, which may select a particular DA 312, within CDN 310, based on factors in addition to, or in lieu of, location (e.g., QoE parameters and/or other factors).

CDN 310 may, in some implementations, receive and cache content from content origin server 320 (e.g., on a periodic or intermittent basis). When user device 305 requests content (e.g., content that is provided by content origin server 320) that is cached by CDN 310, CDN 310 may provide the content to user device 305. For example, the request for content may be forwarded to CDN 310 in lieu of being forwarded to content origin server 320. When providing the content to user device 305, the content may be provided via network 325 and/or another network.

Content delivery controller 315 may include one or more server devices that may control the delivery of content via CDNs 310 and/or particular DAs 312 associated with CDNs 310. As described in greater detail below, content delivery controller 315 may receive information regarding user device 305, CDNs 310, and/or DAs 312, and may select a particular CDN 310 and/or DA 312 to deliver content to user device 305 based on the information. In some implementations, content delivery controller 315 may select a quality of content based on the information. For example, a particular item of content (e.g., a video content item) may be associated with different codecs and/or bitrates (e.g., different bitrates associated with a same codec), and content delivery controller 315 may select a particular codec and/or bitrate to deliver to user device 305. As described below, for example with respect to FIGS. 4 and 5, one or more content delivery controllers 315 may be deployed in a hierarchical architecture (in which one content delivery controller 315 aggregates information from other content delivery controllers 315) and/or a flat architecture (in which one content delivery controller 315 receives information from multiple CDNs 310 and/or DAs 312).

Content origin server 320 may include one or more server devices that store and/or provide content (e.g., video content, audio content, etc.). In some implementations, content origin server 320 may provide content to CDNs 310 (e.g., may provide content to CDNs 310 upon request by CDNs 310 and/or another device, may push content to CDNs 310 on a periodic and/or intermittent basis, etc.). In some implementations, content, provided by content origin server 320, may be stored by CDNs 310 without any specific operation, pertaining to the storage by CDN 310, being performed by content origin server 320. In this sense, content origin server 320 may not be "aware of" CDNs 310. For example, content, provided by content origin server 320, may be forwarded to CDNs 310 by one or more devices of network 325.

Network 325 may include one or more wired and/or wireless networks. For example, network 325 may include a packet data network ("PDN"), such as an Internet Protocol ("IP")-based PDN. Network 325 may include, for example, a wide area network ("WAN") such as the Internet, a core network of a telecommunications provider, a private enterprise network, and/or one or more other networks. In some implementations, network 325 may include a radio access network ("RAN"), with which user device 305 may communicate wirelessly. For example, network 325 may include an evolved packet system ("EPS") that includes a long term evolution ("LTE") network and/or an evolved packet core ("EPC") network that operate based on a third generation partnership project ("3GPP") wireless communication standard. The LTE network may be, or may include, a RAN that includes one or more base stations (which may take the form of an evolved Node B), via which user device 305 may communicate with the EPC network. The EPC network may include one or more serving gateways ("SGWs"), PDN gateways ("PGWs"), and/or mobility management entities ("MMEs"), and may enable user device 305 to communicate with other networks (e.g., the Internet, an IP multimedia subsystem ("IMS") core network, etc.). Network 325 may include a domain name system ("DNS") server, and/or one or more devices, that determine whether content, provided by content origin server 320 and requested by user device 305, is stored at a particular CDN 310. Based on such a request, the DNS server may provide, to user device 305, a location identifier (e.g., IP address) to a particular CDN 310 and/or DA 312 in lieu of a location identifier to content origin server 320.

Figure 4:
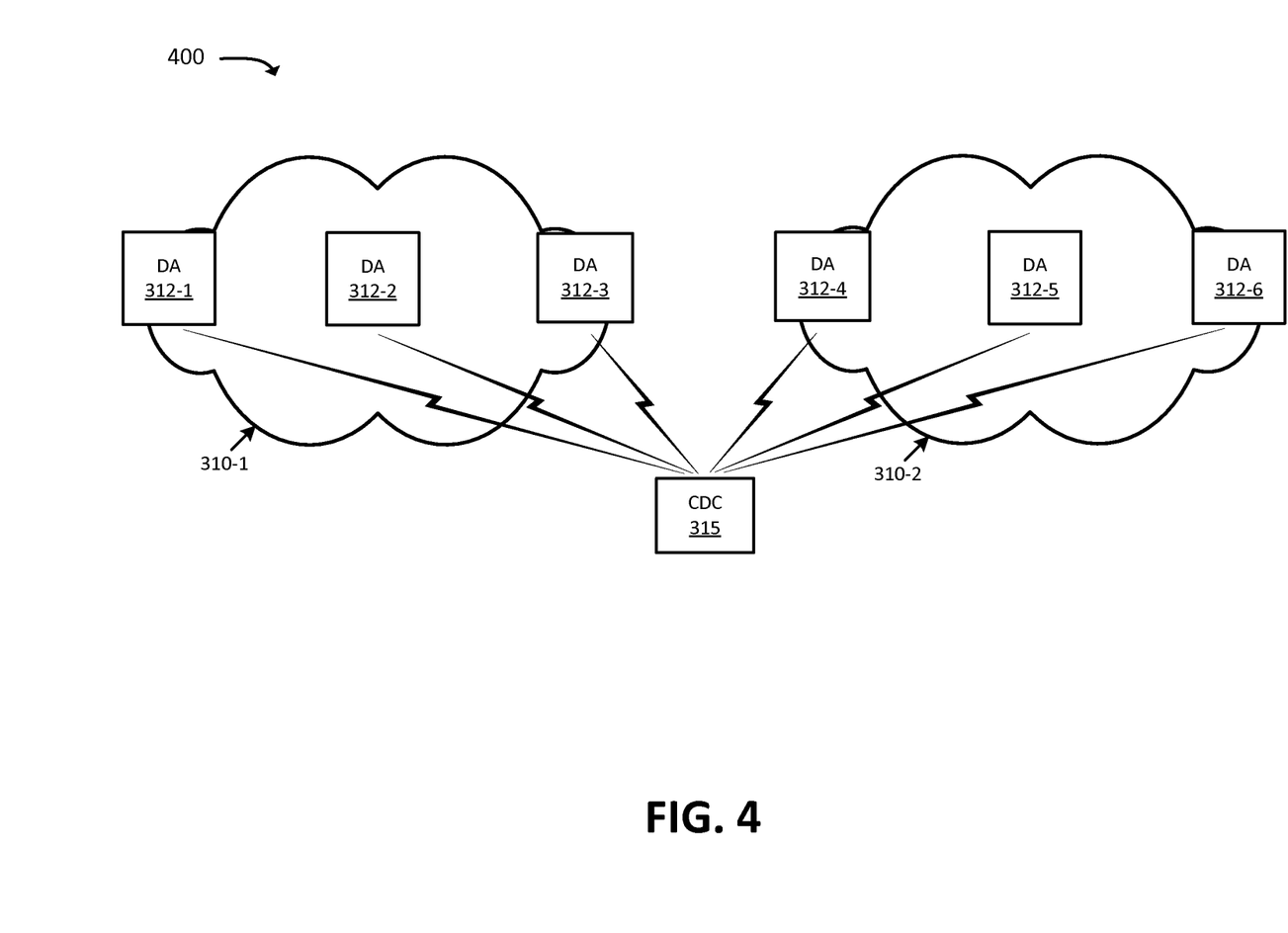
Figure 5:
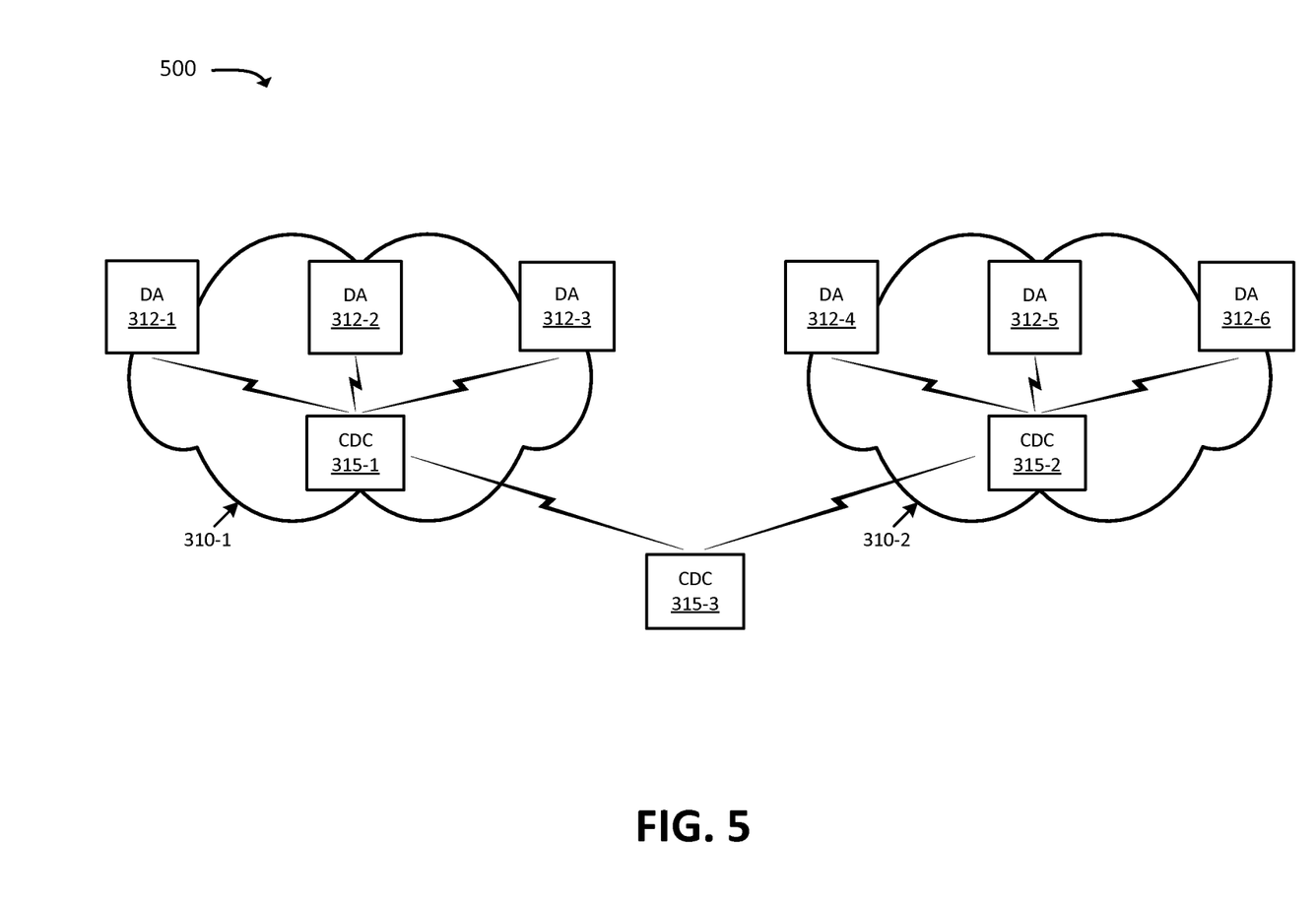

FIGS. 4 and 5 illustrate example environments 400 and 500, which may be different views of one or more devices shown in FIG. 3. Environment 400, shown in FIG. 4, may be a "flat" arrangement of content delivery controller (shown as "CDC" in the FIG. 315 with respect to multiple CDNs, such as example CDNs 310-1 and 310-2. As shown, content delivery controller 315 may be in communication with devices associated with CDN 310-1 and CDN 310-2. For example, content delivery controller 315 may send and/or receive information to and/or from DAs 312-1 through 312-3, associated with CDN 310-1, and may send and/or receive information to and/or from DAs 312-4 through 312-6, associated with CDN 310-2. While shown in this figure as direct connections, in some implementations, content delivery controller 315 may communicate with DAs 312 in an indirect manner (e.g., communications between content delivery controller 315 and DAs 312 may traverse, and/or be forwarded by, one or more intervening devices, such as CDN controller device associated with a particular CDN 310 (not shown)).

For example, each CDN 310 may provide network status information (e.g., network utilization and/or resource availability information regarding) to content delivery controller 315. In some implementations, the network status information may be provided on a per-CDN basis. For example, a particular CDN 310 may provide overall network status information to content delivery controller 315, which may be based on an aggregation of information from individual DAs 312 and/or other devices. As another example, a particular CDN 310 may provide more granular information to content delivery controller 315, such as utilization and/or availability information associated with individual DAs 312. Content delivery controller 315 may also send content delivery instructions to CDNs 310 and/or DAs 315, such as CDN and/or DA selection instructions.

FIG. 5 illustrates environment 500, in which multiple content delivery controllers 315-1 through 315-3 may be arranged in a hierarchical manner. For example, content delivery controller 315-1 may receive network status information associated with CDN 310-1 (e.g., may directly and/or indirectly receive status information from DAs 315-1 through 315-3), and content delivery controller 315-2 may receive network status information associated with CDN 310-2 (e.g., may directly and/or indirectly receive status information from DAs 315-4 through 315-6). Content delivery controller 315-3 may receive network status information from content delivery controller 315-1 and content delivery controller 315-2 (e.g., information regarding CDNs 310-1 and 310-2, respectively), and may make CDN and/or DA selections based on the information. Content delivery controller 315-3 may issue selection instructions to content delivery controllers 315-1 and content delivery controller 315-2, which may carry out the instructions (e.g., may cause DAs 312 to output content and/or cease providing content to user device 305).

The devices and/or networks, illustrated in FIGS. 3-5, are illustrated, as shown, for explanatory purposes only. In practice, there may be additional devices and/or networks; fewer devices and/or networks; different devices and/or networks; or differently arranged devices and/or networks than illustrated in FIGS. 3-5. Alternatively, or additionally, one or more of the devices of environments 300, 400, and/or 500 may perform one or more functions described as being performed by another one or more of the devices of environments 300, 400, and/or 500. Devices of environments 300, 400, and/or 500 may interconnect via wired connections, wireless connections, or a combination of wired and wireless connections.

Figure 6:
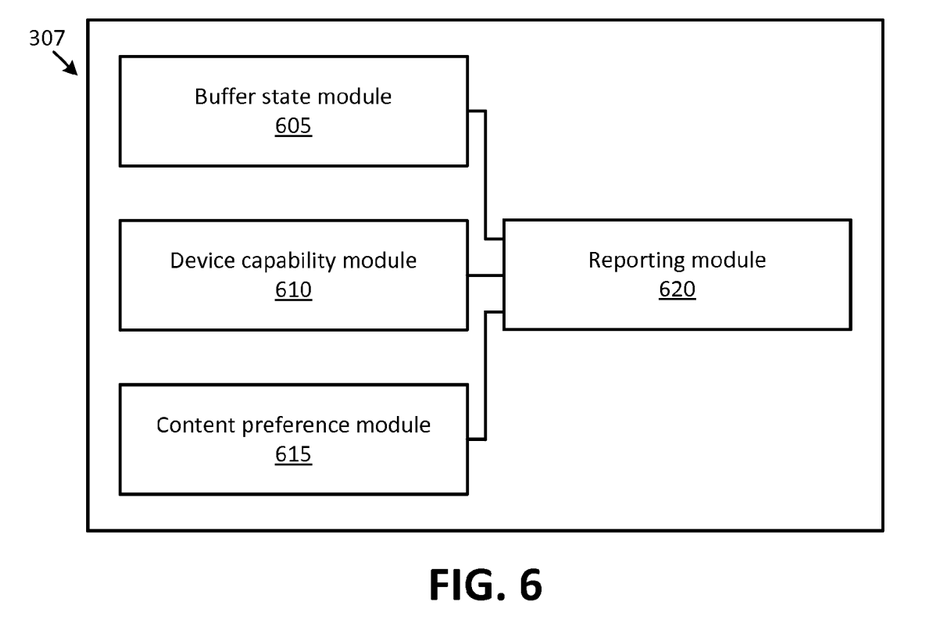
FIG. 6 illustrates example functional components of a content agent, in accordance with some implementations.

FIG. 6 illustrates example functional components of content agent 307. As shown, example content agent 307 may include buffer state module 605, device capability module 610, content preference module 615, and reporting module 620. Modules 605-620 may include hardware circuitry and/or software applications that perform some or all of the functionality described below. For example, one or more of modules 605-620 may include SDN capability, via which modules 605-620 may receive information regarding network traffic sent and/or received by a particular user device 305, with which content agent 307 is associated. In some implementations, the functionality of one module may be performed by one or more modules, and/or the functionality described below with respect to multiple modules may be performed by one module. In some implementations, content agent 307 may include additional, fewer, different, and/or differently arranged modules.

In some implementations, some or all of content agent 307 may be implemented by a software plug-in, which may be available for download from a website and/or another source. For example, a network service provider (e.g., a wireless telecommunications provider) and/or another entity (e.g., an entity associated with CDN 310 and/or content delivery controller 315) may provide the software plug-in. Additionally, or alternatively, some or all of content agent 307 may be installed in user device 305 as part of the manufacture of user device 305 (e.g., before delivery to an end user of user device 305). In some implementations, content agent 307 may be installed at a kernel layer and/or another layer below an application layer of user device 305.

Buffer state module 605 may receive and store information regarding a buffer state associated with content received by user device 305. For example, the buffer may be associated with a particular item of streaming content, such as streaming video content. The information, received by buffer state module 605, may indicate how much content is buffered (e.g., how much content after a current position, in the content, that is being played by user device 305). The amount may be expressed in terms of time (e.g., seconds, milliseconds, etc.), amount of data (e.g., kilobytes, megabytes, etc.), and/or in another suitable manner.

Figure 7:
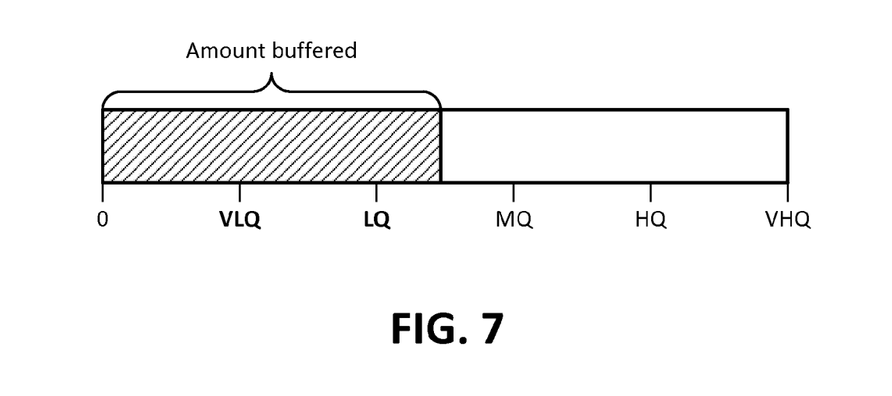
FIG. 7 conceptually illustrates a content buffer state, which may be monitored by a content agent of a user device.

FIG. 7 conceptually illustrates a content buffer state, which buffer state module 605 may monitor. The amount of content buffered may be represented by the shaded region. Various thresholds may be associated with different levels of quality of the content. For example, as shown, thresholds may relate to very low quality ("VLQ") content, low quality ("LQ") content, medium quality ("MQ") content, high quality ("HQ") content, and very high quality ("VHQ") content. These thresholds may indicate amounts that represent an "acceptable" QoE for the particular quality of content. For example, as shown, the amount buffered may be greater than the LQ threshold, but less than the MQ threshold. Thus, it may be determined that low quality content (or very low quality content) may be accessed by user device 305 with an acceptable QoE, but medium quality (or higher) content may not be accessed by user device 305 with an acceptable QoE.

While five thresholds (VLQ, LQ, MQ, HQ, and VHQ) are shown in FIG. 7, in practice, additional, fewer, or different thresholds may be used. The thresholds may be determined by an administrator (e.g., an administrator associated with content agent 307). In some implementations, the thresholds may be determined on a per-content basis. For example, one item of content may be associated with five quality thresholds, while another item of content may be associated with three quality thresholds. As another example, one item of content may be associated with one set of five thresholds, while another item of content may be associated with a different set of five thresholds (e.g., a VLQ threshold for one item of content may be different from a VLQ threshold for another item of content).

In some implementations, buffer state module 605 may monitor buffers on a per-content basis. For example, one item of content may be associated with one buffer, while another item of content may be associated with a different buffer. In some implementations, buffer state module 605 may monitor a buffer on an overall per-user device basis. For example, a particular buffer, monitored by buffer state module 605, may reflect all content currently being streamed to a particular user device 305.

Returning to FIG. 6, device capability module 610 may receive and store information regarding capabilities of user device 305, with which content agent 307 is associated. For example, device capability module 610 may store information regarding a display screen size of user device 305, a maximum and/or a minimum resolution associated with a display screen user device 305, a quantity of audio channels supported by user device 305, etc. Device capability module 610 may receive the device capability information manually, such as from a user of user device 305 or a manufacturer of user device 305 (in instances where content agent 307 is installed by the manufacturer), and/or in an automated fashion (e.g., may request and receive the device capability information from another component of user device 305 and/or from an external source).

Content preference module 615 may receive content preference information, which may indicate a quality of content that should be received by user device 305. The content preference information may correspond to, for example, information provided by a user of user device 305. For instance, the user may indicate that the user desires to access content at the "HQ" setting. In some implementations, content preference module 615 may automatically determine content preference information, and/or may receive automatically determined content preference information. For example, the automatically determined content preference information may correspond to a bandwidth at which user device 305 is capable of receiving content.

Reporting module 620 may receive information from one or more of modules 605-615, and may generate reports and/or alerts based on the information. Reporting module 620 may provide the reports and/or alerts to content delivery controller 315, which may facilitate content delivery controller 315 in performing CDN and/or DA selection, as described below. In some implementations, reporting module 620 may report some or all information received from one or more of modules 605-615 on a period and/or intermittent basis, during a one-time communication with content delivery controller 315 (e.g., during a set-up, registration, or handshake procedure with content delivery controller 315), etc.

In some implementations, reporting module 620 may generate alerts upon detecting potential QoE issues. For example, reporting module 620 may generate a buffer state alert when an amount of streaming content buffered is below, or is approaching, a minimum amount associated with a current quality of the content. As another example, if a content preference changes during playback (e.g., based on a user selection) of streaming content, reporting module 620 may generate a buffer state alert when an amount of streaming content buffered is below, or is approaching, a minimum amount associated with the selected quality of the content. As yet another example, reporting module 620 may generate a device capability alert when a quality of content exceeds the capabilities of user device 305. For instance, if streaming content is being received at a 1920×1080 resolution and the maximum resolution supported by user device 305 is 1280×720, reporting module 620 may generate an alert indicating that the present quality exceeds a quality that user device 305 is capable of presenting.

Figure 8:
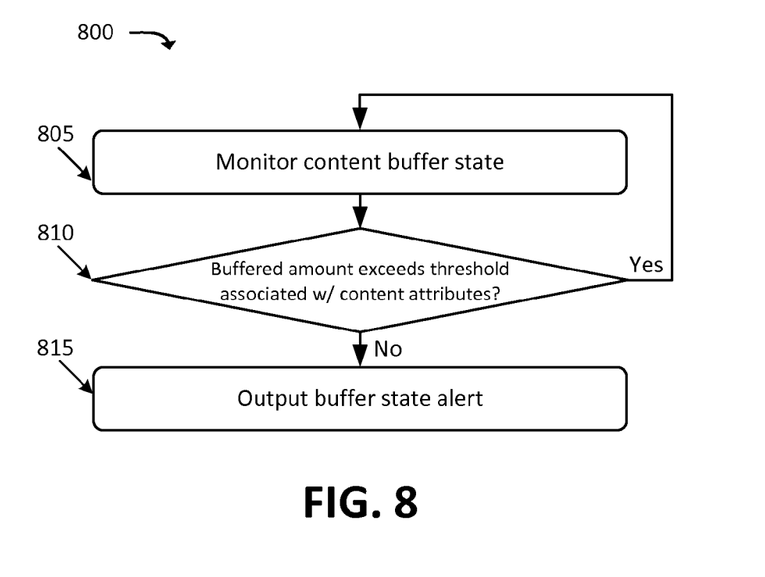
FIGS. 8-10 illustrate example processes for providing information to a content delivery controller, which the content delivery controller may use to reallocate CDN resources.
Figure 9:
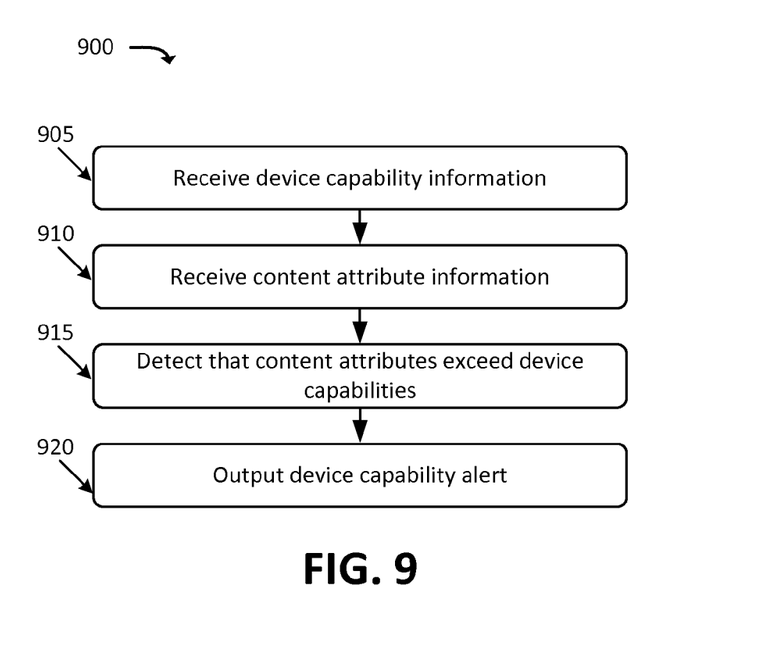
Figure 10:
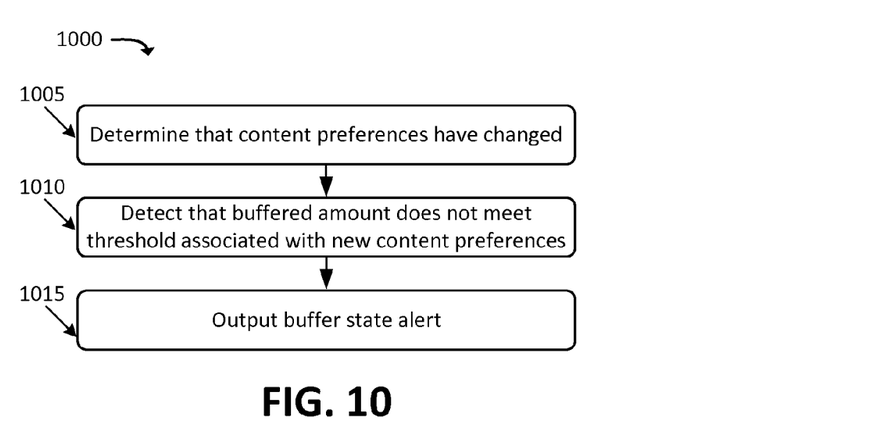

FIGS. 8-10 illustrate example processes 800, 900, and 1000, which may correspond to the generation of alerts, which may be used to perform CDN and/or DA selection, and/or content quality selection. In some implementations, processes 800, 900, and 1000 may be performed by content agent 307 (e.g., by one or more of modules 605-620). In some implementations, some or all of processes 800, 900, and/or 1000 may be performed by one or more other devices in addition to, or in lieu of, content agent 307.

As shown in FIG. 8, process 800 may include monitoring (at 805), a content buffer state. For example, as described above with respect to buffer state module 605, content agent 307 may monitor an amount (e.g., as expressed in terms of time, amount of data, etc.) of content, buffered by user device 305, on a per-content basis and/or on an overall basis. Content agent 307 may also receive information indicating content parameters, such as a quality associated with the content (e.g., as expressed in terms of a bitrate of the content, levels of quality (e.g., VLQ, LQ, MQ, HQ, VHQ, etc.), and/or in another suitable fashion).

Process 800 may also include determining (at 810) whether a buffered amount of content exceeds a threshold associated with attributes associated with the content. For example, content agent 307 may compare the amount of buffered content to a threshold associated with a level of quality of the content. If the buffered amount does not exceed the threshold associated with attributes associated with the content (at 810—NO), content agent 307 may output (at 815) a buffer state alert. The buffer state alert may generally indicate that the buffer is not full enough to support the content being received (e.g., additional data should be buffered to decrease the possibility that the buffer will become depleted during playback of the content).

For example, content agent 307 may output the buffer state alert to content delivery controller 315. The buffer state alert may include information identifying user device 305 (e.g., an IP address, an International Mobile Station Equipment Identity ("IMEI"), an International Mobile Subscriber Identity ("IMSI") value, and/or identifying information), information identifying the content (e.g., a stream identifier, a session identifier, and/or other identifying information), an amount of content currently buffered by user device 305 (which may be, for example, an instantaneous value and/or an average value based on values measured over a particular period of time), a threshold value associated with the current content, and/or other information. If, on the other hand, the buffered amount exceeds the threshold associated with attributes associated with the content (at 810—YES), content agent 307 may continue to monitor (at 805) the content buffer state.

As shown in FIG. 9, process 900 may include receiving (at 905) device capability information. For example, as described above with respect to device capability module 610, content agent 307 may receive information regarding audio, video, and/or other capabilities of the device. The information may indicate, for example, a maximum video resolution and/or a maximum screen size associated with user device 305, a quantity of audio channels supported by user device 305, a maximum audio sampling frequency supported by user device 305, etc.

Process 900 may further include receiving (at 910) content attribute information. For example, content agent 307 may receive information indicating a quality of content being streamed to user device 305. The content attribute information may include, for example, information indicating a resolution of the content, a quantity of audio channels associated with the content, an audio quality associated with the content (e.g., a bitrate of audio and/or an audio sampling frequency), etc.

Process 900 may also include detecting (at 915) that the content attributes exceed the device capabilities. For example, content agent 307 may compare the content attribute information (received at 910) to the device capability information (received at 905), to determine that one or more of the device's capabilities are exceeded. For example, the received content may be at a 1920×1080 resolution, while user device 305 is capable of supporting a maximum resolution of 1280×720. In this situation, user device 305 may perform a scaling operation in order to display the 1920×1080 content at 1280×720. The user's experience may be negatively affected, as the video may be distorted (e.g., "flattened" or "stretched"). Further, network resources may be wasted, as more bandwidth may be consumed by providing the content that exceeds the device's capabilities.

Process 900 may additionally include outputting (at 920) a device capability alert. For example, content agent 307 may output an alert to content delivery controller 315, indicating that the present content exceeds the capabilities of user device 305. The alert may include information identifying user device 305, information identifying the content, information regarding the content attributes (e.g., an attribute that is pertinent to the capability that is being exceeded), and information regarding the device capability that is being exceeded (e.g., the maximum resolution, in this example).

In some implementations, in lieu of, or in addition to outputting a device capability alert to content delivery controller 315, content agent 307 may automatically select content parameters based on the determined device capabilities. For example, assume that a user of user device 305 selected to receive content at a 1920×1080 resolution, and that user device is capable of displaying a maximum resolution of 1280×720. Content agent 307 may modify a request for content (and/or may output a new request for content), that reflects the determined maximum resolution of 1280×720. Additionally, or alternatively, content agent 307 may output an alert to a user of user device 305. The user may select new content parameters based on the device capability. For example, a user may desire to utilize as little network bandwidth as possible, and may benefit from being informed of the maximum resolution (or other parameters) supported by user device 305.

As shown in FIG. 10, process 1000 may include determining (at 1005) that content preferences have changed. For example, as described above with respect to content preference module 615, content agent 307 may receive information indicating that preferences for attributes of content, currently being received by user device 305, have changed. For example, the change may be a result of input from a user and/or based on an automatic determination, by user device 305 or another device, that the content attributes should be changed. The change in attributes may be, for example, a change in video resolution, a change in quality of audio, and/or changes to other attributes (e.g., attributes which may affect an amount of network resources, such as network bandwidth, would be consumed by delivering the content to user device 305).

Process 1000 may also include detecting (at 1010) that a buffered amount of content does not meet a threshold associated with the new content preferences. For example, as described above with respect to buffer state module 605, content agent 307 may compare an amount of content, buffered by user device 305, to determine whether the amount of buffered content meets a threshold amount associated with the new content preferences. In situations where the new content preferences are more demanding of network resources (e.g., bandwidth), the amount of content provided to user device 305 (and thus, the amount of content buffered by user device 305) may be below the threshold associated with the new content preferences.

Process 1000 may additionally include outputting (at 1015) a buffer state alert. For example, content agent 307 may provide a buffer state alert to content delivery controller 315. The buffer state alert may include, for example, information identifying user device 305, information regarding the current buffer state associated with the content, information regarding the threshold amount associated with the new content attributes, information identifying the content, and/or other information.

Figure 11:
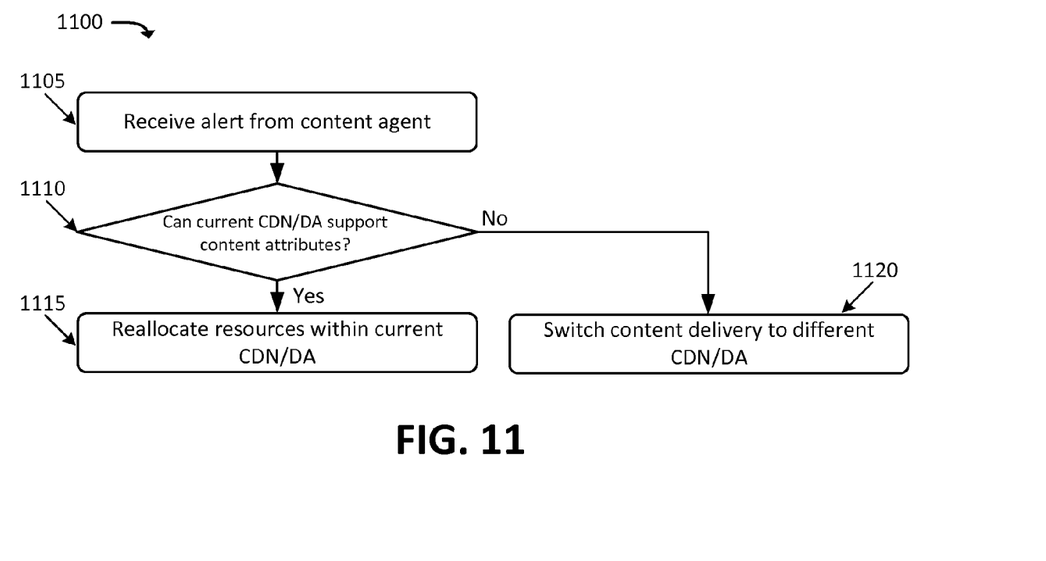
FIG. 11 illustrates an example process for reallocating CDN resources.

FIG. 11 illustrates an example process 1100 for reallocating CDN resources based on information received from a content agent and/or a CDN. In some implementations, process 1100 may be performed by one or more content delivery controllers 315. In other implementations, some or all of process 1100 may be performed by one or more devices other than content delivery controller 315.

As shown in FIG. 11, process 1100 may include receiving (at 1105) an alert from a content agent. For example, content delivery controller 315 may receive an alert, such as the example alerts described above (e.g., with regard to FIGS. 9-11) and/or another type of alert. As mentioned above, the received alert may identify user device 305, with which the alert is associated. The alert may also include information identifying content that is being provided to user device 305, threshold information regarding the content (e.g., threshold buffer state information), and information regarding a buffer state associated with user device 305. In some implementations, content delivery controller 315 may identify a particular CDN 310 and/or DA 312, via which the content is being delivered. For example, content delivery controller 315 may identify the particular DCN 310 and/or DA 312 based on the information identifying the content and/or the information identifying user device 305.

Process 1100 may also include determining (at 1110) whether a CDN and/or a DA, which is currently delivery content to the user device, can support the attributes of the content. For example, as described above, content delivery controller 315 may receive and store network status information regarding CDNs 310 and/or DAs 315. Based on the received network status information, content delivery controller 315 may determine whether the particular CDN 310 and/or DA 315, which is currently delivering the content to user device 305, has available resources to provide the content using the new content attributes. For example, content delivery controller 315 may determine whether content delivery controller 315 may determine whether the particular CDN 310 and/or DA 315 has enough resources available to increase the bandwidth, associated with providing the content to user device 305, to a level by which the higher quality content can be delivered to user device 305.

If the current CDN and/or DA can support the content attributes (at 1110—YES), then process 1100 may include reallocating (at 1115) resources within the current CDN and/or DA. For example, content delivery controller 315 may send an instruction to the particular CDN 310 and/or DA 315 to reallocate resources, in order to provide a level of service based on the new content attributes. As one example, content delivery controller 315 may send an instruction to a particular CDN 310 to deliver the content via a different DA 315 than is currently delivering the content.

In some implementations, content delivery controller 315 may not be "aware" of the DAs 315 within a particular CDN 310. For example, as mentioned above, content delivery controller 315 may, in some implementations, be in communication with a CDN controller associated with CDN 310, which does not provide information regarding individual DAs within CDN 310. In these situations, content delivery controller 315 may provide (at 1115) an instruction to the CDN controller to allocate or to reallocate resources, based on the new content attributes, and the CDN controller may allocate or reallocate the resources in a manner that is independent of content delivery controller 315.

If, on the other hand, the current CDN and/or DA cannot support the content attributes (at 1110—NO), then process 1100 may include switching (at 1120) the delivery of the content to another current CDN and/or DA. For example, if content delivery controller 315 determines that the current CDN 310 and/or DA 312 does not have available resources to support the new content attributes (e.g., the current CDN 310 and/or DA 312 does not have available bandwidth to provide the amount of content specified by the threshold associated with the new content attributes), then content delivery controller 315 may switch the delivery of the content to another CDN 310 and/or DA 312 that can support the new content attributes. For example, content delivery controller 315 may send an instruction to the current CDN 310 and/or DA 312 to cease providing the content to user device 305, and may send an instruction to another CDN 310 and/or DA 312 to begin providing the content to user device 305.

Figure 12:
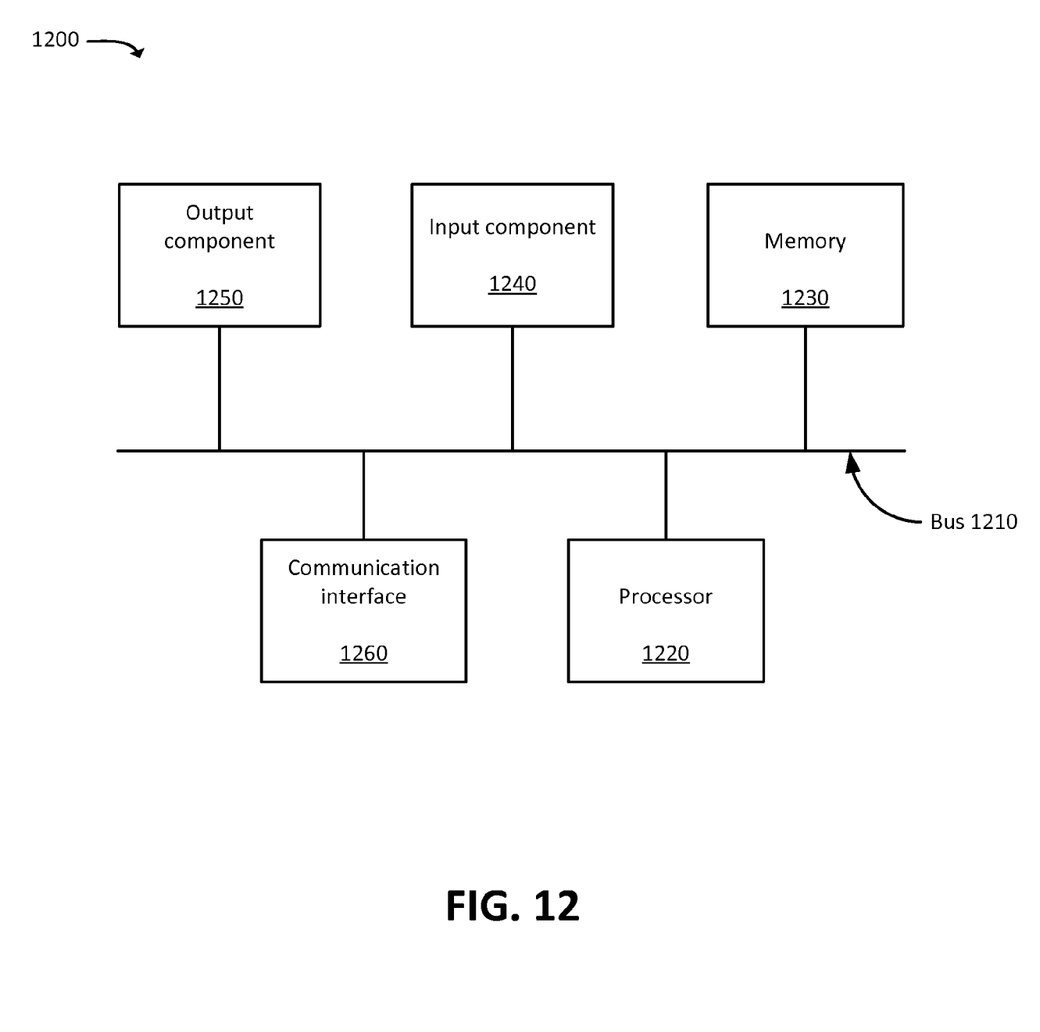
FIG. 12 illustrates example components of one or more devices, according to one or more implementations described herein.

FIG. 12 is a diagram of example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 8-11, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
receiving, by a server device, information indicating that a user device has requested content, the requested content being associated with at least a particular attribute set at a first value;
comparing, by the server device, capability information associated with the user device, to the first value of the particular attribute;
determining, based on the comparing and by the server device, that the first value of the attribute exceeds a value associated with one or more capabilities of the user device;
generating, based on determining that the first value of the attribute exceeds the value associated with the one or more capabilities of the device and by the server device, a modified request for the content, the modified request including a second value for the particular attribute, the second value being determined based on the capability information associated with the user device, wherein the user device receives the content based on the second value for the particular attribute;
receiving, by the server device, an alert indicating that an amount of the content, buffered by the user device, is below a threshold amount that is associated with the second value of the particular attribute of the content, the content being provided to the user device by a content delivery network ("CDN");
determining, by the server device, whether the CDN has available resources to provide the content to the user device at a particular bandwidth that is based on the second value of the particular attribute of the content;
instructing, by the server device and when the CDN has the available resources, the CDN to reallocate resources to provide the content to the user device at the particular bandwidth; and
switching, by the server device and when the CDN does not have the available resources, delivery of the content to another CDN.

2. The method of claim 1, wherein the instructing the CDN to reallocate resources includes:
identifying a particular delivery appliance, associated with the CDN, that has available resources to provide the content at the particular bandwidth; and
instructing the CDN to provide the content via the particular delivery appliance.

3. The method of claim 2, further comprising:
periodically or intermittently receiving network status information regarding a set of delivery appliances associated with the CDN,
wherein the particular delivery appliance is identified, as having available resources to provide the content at the particular bandwidth, based on the received network status information.

4. The method of claim 1, further comprising:
receiving network status information regarding the other CDN; and
determining, based on the network status information, that the other CDN has available resources to provide the content at the particular bandwidth,
wherein switching the delivery of the content to the other CDN is based on determining that the other CDN has available resources to provide the content at the particular bandwidth.

5. The method of claim 4, wherein switching the delivery of the content to the other CDN includes selecting a particular delivery appliance, associated with the CDN, via which the content is to be delivery to the user device.

6. The method of claim 1, wherein the particular attribute of the content is based on a measure of quality associated with the content.

7. The method of claim 6, wherein the measure of quality, associated with the content, is based on a bitrate associated with the content.

8. A system, comprising:
a memory device storing a set of computer-executable instructions; and
a processor configured to execute the computer-executable instructions, wherein executing the computer-executable instructions causes the processor to:
receive information indicating that a user device has requested content, the requested content being associated with at least a particular attribute set at a first value;
compare capability information associated with the user device, to the first value of the particular attribute;
determine, based on the comparing, that the first value of the attribute exceeds a value associated with one or more capabilities of the device;
generate, based on determining that the first value of the attribute exceeds the value associated with the one or more capabilities of the device, a modified request for the content, the modified request including a second value for the particular attribute, the second value being determined based on the capability information associated with the user device, wherein the user device receives the content based on the second value for the particular attribute, indicated in the modified request;
receive an alert indicating that an amount of the content, buffered by the user device, is below a threshold amount that is associated with the second value of the particular attribute of the content, the content being provided to the user device by a content delivery network ("CDN");
determine whether the CDN has available resources to provide the content to the user device at a particular bandwidth that is based on the second value of the particular attribute of the content;

instruct, when the CDN has the available resources, the CDN to reallocate resources to provide the content to the user device at the particular bandwidth; and switch, when the CDN does not have the available resources, delivery of the content to another CDN.

9. The system of claim 8, wherein executing the processor-executable instructions, to instruct the CDN to reallocate resources, further causes the processor to:

identify a particular delivery appliance, associated with the CDN, that has available resources to provide the content at the particular bandwidth; and instruct the CDN to provide the content via the particular delivery appliance.

10. The system of claim 9, wherein executing the processor-executable instructions further causes the processor to:

periodically or intermittently receive network status information regarding a set of delivery appliances associated with the CDN, wherein the particular delivery appliance is identified, as having available resources to provide the content at the particular bandwidth, based on the received network status information.

11. The system of claim 8, wherein executing the processor-executable instructions further causes the processor to:

receive network status information regarding the other CDN; and determine, based on the network status information, that the other CDN has available resources to provide the content at the particular bandwidth, wherein switching the delivery of the content to the other CDN is based on determining that the other CDN has available resources to provide the content at the particular bandwidth.

12. The system of claim 11, wherein switching the delivery of the content to the other CDN includes selecting a particular delivery appliance, associated with the CDN, via which the content is to be delivery to the user device.

13. The system of claim 8, wherein the particular attribute of the content is based on a measure of quality associated with the content.

14. The system of claim 13, wherein the measure of quality, associated with the content, is based on a bitrate associated with the content.

15. A non-transitory computer-readable medium storing a set of computer-executable instructions, wherein execution of the computer-executable instructions, by a processor, causes the processor to:

receive information indicating that a user device has requested content, the requested content being associated with at least a particular attribute set at a first value;

compare capability information associated with the user device, to the first value of the particular attribute;

determine, based on the comparing, that the first value of the attribute exceeds a value associated with one or more capabilities of the device;

generate, based on determining that the first value of the attribute exceeds the value associated with the one or more capabilities of the device, a modified request for the content, the modified request including a second value for the particular attribute, the second value being determined based on the capability information associated with the user device, wherein the user device receives the content based on the second value for the particular attribute, indicated in the modified request;

receive an alert indicating that an amount of the content, buffered by the user device, is below a threshold amount that is associated with the second value of the particular attribute of the content, the content being provided to the user device by a content delivery network ("CDN");

determine whether the CDN has available resources to provide the content to the user device at a particular bandwidth that is based on the second value of the particular attribute of the content;

instruct, when the CDN has the available resources, the CDN to reallocate resources to provide the content to the user device at the particular bandwidth; and switch, when the CDN does not have the available resources, delivery of the content to another CDN.

16. The non-transitory computer-readable medium of claim 15, wherein execution of the processor-executable instructions, to instruct the CDN to reallocate resources, further causes the processor to:

identify a particular delivery appliance, associated with the CDN, that has available resources to provide the content at the particular bandwidth; and instruct the CDN to provide the content via the particular delivery appliance.

17. The non-transitory computer-readable medium of claim 16, wherein execution of the processor-executable instructions further causes the processor to:

periodically or intermittently receive network status information regarding a set of delivery appliances associated with the CDN, wherein the particular delivery appliance is identified, as having available resources to provide the content at the particular bandwidth, based on the received network status information.

18. The non-transitory computer-readable medium of claim 15, wherein execution of the processor-executable instructions further causes the processor to:

receive network status information regarding the other CDN; and determine, based on the network status information, that the other CDN has available resources to provide the content at the particular bandwidth, wherein switching the delivery of the content to the other CDN is based on determining that the other CDN has available resources to provide the content at the particular bandwidth.

19. The non-transitory computer-readable medium of claim 18, wherein switching the delivery of the content to the other CDN includes selecting a particular delivery appliance, associated with the CDN, via which the content is to be delivery to the user device.

20. The non-transitory computer-readable medium of claim 15, wherein the particular attribute of the content is based on a measure of quality associated with the content.

* * * * *